United States Patent Office
3,202,623
Patented Aug. 24, 1965

3,202,623
PROCESS OF PREPARING RUBBERIZED
COMPOSITIONS
Herbert A. Endres, Cuyahoga Falls, Ohio, Harold B. Pullar, Hot Springs, Ark., and Paul W. Gilkeson, Jr., Houston, Tex., assignors to The Goodyear Tire & Rubber Company, Akron, Ohio, a corporation of Ohio
No Drawing. Filed Jan. 19, 1961, Ser. No. 83,640
7 Claims. (Cl. 260—28.5)

This invention is a continuation-in-part of the invention disclosed in copending application S.N. 587,947, filed May 29, 1956, now abandoned. This invention relates to a rubber-like composition and is more particularly directed to a material comprising a rubber and a hard bitumen combined, to a process for preparing the composition, and to uses for the material.

Bituminous surfaces are normally susceptible to deterioration by various elements such as frictional erosion and atmospheric degradation. When such surfaces are exposed to climatic conditions, water invades the surface and tends to break the bond between the bitumen and the aggregate because water has a greater affinity for the aggregate than does the bitumen. Also, oxidation causes the bitumen to harden and thus start pitting and stripping. Because bitumens differ so much in physical and chemical properties, it is very difficult to control the plasticity and ductility of surfaces made from bituminous compositions. All bitumens have the undesirable characteristics of being soft and sticky in hot weather and hard and brittle in cold weather. These, and other objections to the use of bituminous compositions as surfacing materials, have been substantially alleviated by the practice of this invention whereby a readily dispersible powder, comprised of an intimate mixture of rubber and a hard bituminous carrier, is incorporated into a liquid bitumen. A small amount of rubber has been found to have a very marked effect by substantially reducing the temperature susceptibility of the bitumen as well as adding desirable qualities to the surface. The rubber thus compounded has a tendency to swell and absorb the lower boiling constituents of the bitumen. In this manner, serious defects in bituminous surfaces have been alleviated. Attempts have previously been made to use rubber as a bituminous additive. It has been observed that a small percentage of rubber improves the properties of bituminous compositions. Vulcanized rubber particles have been added to hot bitumens, and latex rubber has been mixed with hot bitumens or an emulsion containing bitumens.

These methods of incorporating rubber in bituminous compositions leave much to be desired. The addition of rubber in the form of latex is subject to the disadvantage that the composition must be mixed until all the water is driven off. Also, the mixture tends to foam. On the other hand, if the rubber is added in the form of vulcanized particles, it resists penetration by bitumens and, consequently, is only partially effective. Semi-vulcanized rubber particles are not free-flowing and tend to mass on storage. Unvulcanized rubber particles are difficult to make and use because they tend to coalesce and block. Since the cost of rubber as compared to the cost of bituminous compositions prevents a large percentage of rubber from being used for most purposes, it is a prime consideration to prepare a rubber additive which will be low enough in cost to allow its use in liquid bitumens. Therefore, it is imperative that the maximum benefit be achieved from the rubber component.

It is known to co-precipitate rubber and mineral fillers of various kinds to form free-flowing powders. However, for many uses, a separating or parting agent which acts also as a vehicle for carrying the rubber into intimate relation with the bitumen by being miscible with it is desirable.

Because the effect of rubber is primarily physical, the distribution of the rubber in a bitumen must be as uniform and complete as possible. This means that the rubber must be finely divided and free-flowing and must be stable and not form lumps or agglomerates during storage. One of the problems in connection with the use of rubber in bitumens has been the development of a practical method of manufacturing such a finely divided and free-flowing rubber powder without resort to mineral detackifiers that persist in the bitumen as a filler.

Thus, the ordinary mineral fillers used in the preparation of powdered rubbers become a part of the aggregate when the powdered rubbers are mixed with liquid bitumens whereas the hard bituminous fillers of this invention become a part of the bituminous phase when the powdered rubbers are mixed with liquid bitumens. Also, ordinary mineral fillers tend to settle when the rubberized filler and bitumen is allowed to stand.

It is an object of this invention to provide a free-flowing, storage-stable rubber composition. It is another object of this invention to provide a composition of rubber and a hard bituminus carrier which can be mixed directly with liquid bituminous compositions. Still another object of this invention is to produce a composition wherein particles of rubber and particles of hard bitumen are closely united or associated. It is a further object of this invention to prepare a composition of rubber and hard bitumen in powdered form. An additional object of this invention is to provide a method of preparing a rubber composition by co-precipitating rubber from latex with a slurry of a hard bitumen in a liquid medium. It is another object of this invention to provide a free-flowing powder comprised of a rubber and a hard bitumen which can be quickly amalgamated into a liquid bituminous composition. Other objects will be apparent as the description proceeds.

In the practice of this invention, a hard asphalt is co-precipitated with a rubber and dried to form a free-flowing, fluffy powder which can be added to various liquid bitumens.

When the powdered mixtures of this invention are added, with agitation, to low viscosity liquid bitumen (asphaltic residuum) in a heated condition, the high and low penetration asphaltic materials quickly and smoothly amalgamate and the rubber particles likewise become quickly dissolved or dispersed in the molten asphalts to form asphaltic-rubber cements in a few seconds. This is possible by reason of the dispersed condition of the powdered asphalt and rubber particles in the mixture whereby quick access of the hot asphaltic residuum to the rubber and hard asphalt particles is permitted.

The term "liquid bitumen" is used herein to define naturally occurring or refined hydrocarbon compositions ranging from substantially viscous to substantially fluid and includes the customary asphalts and the customary tars.

The term "hard bitumen" is used herein to define the naturally occurring class of substances comprised of gilsonite, glance pitch, elaterite, wurtzilite, grahamite and manjak and the hard residues from the distillation of petroleum or coal tar. It also includes the blown petroleum asphalts, sometimes referred to as "mineral rubbers." These hard bitumens, which can be co-precipitated with the rubber and which are derived from petroleum or coal tar, are customarily referred to as petroleum resins or coal tar pitches. These bitumens are high softening point compositions having softening points above 200° F. Preferably, the softening point is above 300° F. and may go up to 400° F. The bitumens are characterized by low penetrations, usually less than 10 at 77° F. Also, they display substantially no ductility at 77° F.

The term "hard bitumen" also includes asphaltic or bituminous materials of which the softening point has been increased to a value high enough to permit pulverization by the addition to a softer asphalt or bitumen of an organophilic bentonite, as disclosed in Hauser Patent No. 2,531,427. Such organophilic bentonites are available commercially under the trade-mark "Bentone" from the National Lead Company. By incorporation of organophilic bentonite with a liquid bitumen, for example, as hereinabove defined, in percentages of several percent or more, depending upon the type of liquid bitumen, products may be obtained having the properties of hard bitumen produced by other means, such as for example by air blowing. Asphalts so hardened are disclosed in Capell Patent No. 2,661,301.

The finely-powdered asphalts constitute a preferred class of hard bitumens. These are pulverulent hard asphalts which will pass a 40-mesh sieve and a substantial portion of which will pass a 200-mesh sieve. The softening point of such asphalts may be from about 200° F. to about 300° F. (ring and ball method) and the penetration (A.S.T.M.-needle) or hardness such as to lend itself to pulverization under ordinary conditions, namely less than about 5 at 77° F.

A useful class of hard asphalts is a group of hydrocarbon resins derived from petroleum bitumens having high softening points (about 200° F., preferably above 300° F.), low penetration (less than 10 at 77° F.) and substantially no ductility at 77° F. and which are substantially gilsonitic asphaltenic carboid carbonic in nature.

A particular type of hard asphalt which has been found to be satisfactory is derived from the propane precipitation of crude oil tank bottoms, having a softening point of approximately 210° F., a penetration at 77° F. using 100 grams for five seconds of 0 to 1, a specific gravity of about 1.035 to about 1.045, Saybolt furol viscosity at 325° F. of approximately one hundred and twenty seconds and is completely soluble in benzene or carbon bisulfide.

Another satisfactory hard asphalt is one of 250-275° F. softening point and of 0 to 1 penetration at 77° F. produced by oxidation of a vacuum distilled asphaltic residuum. Other suitable asphalts may be derived from various crudes, using solvents other than propane as now generally practiced in solvent separation of lubricating oil stocks. The solvent-extracted types of asphalts are preferred since they have rather sharp softening point characteristics, that is, change from solid to liquid phase in a narrow range of temperature, and they amalgamate more readily with the solvents or heated flux oils. Still other hard resins useful in this invention are those made by the process disclosed in British Patent 774,597 wherein a bituminous material is treated with a solvent, such as pentane at an elevated pressure and at a temperature corresponding to the critical temperature of the solvent to separate the hard resins as fluidized phase. The hard resins obtained by this process may have softening points from 200 to about 300 and in excess of 300 for the asphaltenes.

In the practice of this invention, a water suspension of a hard bitumen is combined with rubber latex and then co-precipitated by means of a coagulant. The precipitated compound is filtered, dried and pulverized. The product is inexpensive, easy to handle because it is free-flowing and storage-stable, and readily disperses in bitumens.

In the practice of the invention, a pulverized hard bitumen in an amount of about 5 to 30 parts by weight, is slurried with about 95 to 70 parts by weight of water. The pH of the slurry is adjusted to about 7.0 to 11.0 by the addition of any customary commercial alkali, e.g. metallic alkalies such as sodium, potassium and ammonium hydroxide, and salts which tend to form bases when ionized, such as sodium and potassium carbonates, to prevent premature coagulation of the rubber latex when the powdered hard bitumen and latex are combined. Many of the commercial latices have a pH which is high enough to maintain the slurry system within the indicated range without the addition of additional alkali. The latex and slurried hard bitumen are combined after the pH of the latter has been adjusted. The mixture is then agitated until substantially homogeneous.

Based on the dry weight of the materials, it has been found that about 5 to 40% by weight of rubber can be coagulated with about 95 to 60% by weight of a hard bitumen to obtain a free-flowing, storage-stable product.

Because of the factor of rapid dispersibility and solution in molten bitumens, the particle size of the hard bitumen carrier is important. In order to obtain a free-flowing, rapidly dispersible, rubberized product, no substantial portion of the particles of powdered hard bitumen should be more than about 50 microns in diameter, and a substantial portion should be less than 10 microns in diameter. The powdered hard bitumen will all pass a 40-mesh U.S. standard sieve. Preferably, substantially all of the powdered hard bitumen should pass a 200-mesh U.S. standard sieve, and a substantial portion should pass a 325-mesh sieve.

It has been found that any type of a rubber latex, natural or synthetic, is operable in the practice of this invention. Natural rubber latices, butadiene-styrene latices, i.e., GR–S latices, polybutadiene latices, butadiene-acrylonitrile latices and polyisoprene latices are representative examples. Where the rubber-bitumen powder is to be incorporated into hot asphalts or tars or stored for long periods, it is desirable that the latex contain an antioxidant such as phenylbetanaphthylamine, mixtures of alkylated phenols, etc. It is preferred to use GR–S type latex containing about 26–28% by weight of rubber. These are latices of butadiene-styrene 70:30 copolymers. An equivalent amount of rubber solids from other latices of various rubber concentration may be used.

After the latex and water slurry of hard bitumen have been thoroughly mixed, co-precipitation can be effected by adding a coagulant, i.e., aluminum sulfate, mixtures of aluminum sulfate and sodium chloride, magnesium sulfate, any mineral acid such as hydrochloric, nitric, sulfuric, etc., acetic acid, salts which will form acids upon ionization such as calcium, potassium, magnesium, and barium nitrates, sulfates and chloride and other electrolytes. The particle size of the rubber can be controlled by regulating the pH of the slurry, the concentration of the coagulant, degree of agitation and the rate of addition thereof to the slurry. Finer particle size of rubber-bitumen can be obtained by maintaining vigorous agitation of the slurry during coagulation, by decreasing the concentration of the coagulating solution, by the choice of coagulant, by the use of additives such as sodium ligno sulphonate and sodium polyphosphates and by decreasing the rate at which the coagulant is added to the slurry. The method of adding the coagulant and selection of the coagulant are important because the particle size can be partially controlled in this manner. For example, the composition should be agitated during the coagulation in order to make the composition more uniform and to disperse the coagulant. It has been found that aluminum sulfate provides the best coagulant and should be added in the concentration of about .05 to 5.0% by weight and preferably at a rate sufficient to maintain a concentration of about .10 to about .25% by weight, based on the total slurry including the coagulated material.

The temperature of the slurry at the time of coagulation and co-precipitation is, of course, significant. However, the temperature range can vary considerably depending on the coagulant used and the end use for the final product. The temperature can range from 60° F.

to 150° F. Customarily, room temperature co-precipitation is used in the practice of this invention. Although with the alkali silicofluorides it is desirable to warm the mixture as this permits the coagulant to be added to the latex a short time before the slurry is added and mixed with the latex. Thus, a more intimate mixing of the latex and slurry is obtained.

The exact mechanism of the co-precipitation and the reason the co-precipitate of hard bitumen and rubber is uniquely free-flowing and storage-stable and imparts unusual characteristics to liquid bituminous compositions such as tars, asphalts and oils has not been completely and finally determined. However, inspection under an electron microscope leads to the belief that the rubber-bitumen composition comes out of suspension in the form of a mass of particles wherein there are groups of bitumen particles containing a discontinuous phase of rubber. It is believed that each bitumen particle has an associated thin film of rubber within the pits which are contained in the irregular surface area of the particle and that an interlacing of thin films of rubber surrounds groups of hard bitumen particles. Thereafter, when the composition is dried and pulverized, the rubber films are ruptured allowing bitumen particles which contain a discontinuous rubber phase to protrude through the films. In this manner, a loose free-flowing powder is provided which can be rapidly dispersed in a liquid bituminous phase and which is in the form of small particles, 95% of which will pass through a 60-mesh standard sieve and a substantial portion of which will pass through a 100-mesh standard sieve.

The final rubber-bitumen product may contain from about 5 to 40%, or more, by weight of rubber and from about 95 to 60%, or less, by weight of bitumen. In the practice of this invention, we have found that a dry pulverized composition containing 25% by weight of rubber and 75% by weight of hard bitumen composition gives very satisfactory results.

A novel feature of this invention is that it enables conversion of an asphalt residuum or liquid bitumen into a rubber-asphalt cement in a short period of time and with the same type of equipment and apparatus as used in the production of regular or standard asphalt hot-type mixtures. The products produced are rubberized mixtures which have very definite, improved quality characteristics.

These products, properly combined, show stability equal to, or higher than, the rubber-asphalt mixtures made by prior processes. These mixtures show better anti-stripping properties when subjected to the action of heat, water and agitation. These products show less susceptibility to temperature changes than the products made with straight asphalt mixtures.

The dry rubber-bitumen compositions can be mixed with hot liquid bitumens in the customary manner. The rubber-hard bitumen powders of this invention, when mixed with liquid bitumens, such as asphalts or tars, can be combined with various fillers and aggregates to form surfacing compositions for roads, sidewalks, air-strips, service station aprons, etc. Also, the rubber-hard bitumen powder and liquid bitumen can be used as a top dressing for those applications where top dressings are normally used. Representative examples of the uses for the rubber powders of this invention are in the production of roofing paints, water-proofing compounds, sealing compounds, roofing papers, paper laminating compositions, undercoatings for autos and trucks, bonding materials for irrigation ditches, asphalt sidings, shingles, floor tile, joint fillers for concrete roads, anti-dusting agents and erosion barriers. Also, the products of this invention are useful compositions without being added to liquid bitumens, e.g., as additives to oil base drilling muds, as additives to calking compounds and in the water-proofing of fabrics. The products of this invention can be usde in the form of solutions for various household and miscellaneous uses. The powdered mixtures can be admixed with cold solvents such as kerosene, gasoline, naphtha, turpentine and carbon tetrachloride. In this manner, waterproofing paints and primers, patching cements, etc. can be made.

The reasons why the materials of this invention so markedly modify the properties of liquid bitumens are not completely ascertained. However, from a rheological standpoint, rubber must be highly dispersed in bitumen to have a maximum effectiveness. It is probable that a highly dispersible rubber proceeds to ultimate dispersion in three stages: (1) dispersion of the discrete rubber particle into the mass liquid bitumen; (2) the partial or complete break-down of the rubber particle into molecular or near-molecular size, accompanied by effective "solution" in the bitumen; and (3) a structural re-arrangement occurring between the bitumen micelle and the rubber molecule to form essentially a new material. If a rubber is not capable of phases 1 and 2, the rubber exists merely as sticky particles and gives property changes to the bitumen only as a physical admixture.

It is believed that the maximum effect can be accomplished only through rapid dispersion of the rubber particles. The use of a carrier for the rubber thus becomes imperative. Because the carrier must help disperse the rubber particles in the shortest amount of time in order to obtain complete dispersion before the rubber particles begin to swell, selection of the carrier is very important. The carrier should be one that is selectively wet by a hydrocarbon such as liquid asphalts or tars. This is particularly true when the composition is to be used in road surfacing or other uses where exposure to the atmosphere is necessary. When the carrier is preferentially wet with a liquid bitumen, it can serve as an aid to the rubber in preventing stripping of the surfacing composition from the base by the action of water.

The following illustrative examples are not intended as limitations on the invention:

EXAMPLE 1

A 529 pound batch of powdered rubber-hard bitumen composition was made by co-precipitating GR-S rubber from a 30% latex and powdered gilsonite from a slurry in order to provide a powder comprised of 10% by weight of rubber and 90% by weight of gilsonite.

The gilsonite was comminuted so that substantially all of the powder would pass through a 40-mesh standard screen and a substantial portion would pass through a 100-mesh standard screen. The gilsonite powder was slurried with water under vigorous agitation. The pH of the slurry was approximately 8.0, and thus needed no further adjustment. The 30% latex was added to the gilsonite slurry with vigorous agitation, the mixing time being from 10 to 15 minutes. A 2% alum in water solution was added to the mixture with further agitation to coagulate the rubber and precipitate the gilsonite. Thereafter, the coprecipitated system was fed into a drum type vacuum filter where substantially all of the water was removed. The de-watered mixture was then introduced into an impeller mill equipped with a flash drying system whereby the moisture content was reduced to less than ½% by weight by means of hot air at a temperature of 400–500° F., although the product temperature never exceeded 170° F. The finished product was thereafter packaged in fiber drums for storage and use. The powdered rubber-gilsonite remained free-flowing and storage-stable.

EXAMPLE 2

A 432 pound batch of powdered rubber-gilsonite was prepared as in Example 1, except that the relationship between rubber and powdered gilsonite was 20% by weight of rubber to 80% by weight of gilsonite. This composition also remained free-flowing and storage-stable.

EXAMPLE 3

A 613 pound batch of powdered rubber-gilsonite was prepared as in Example 1 except that the relationship between the rubber and the gilsonite was 25% by weight of rubber and 75% by weight of gilsonite. This product did not display any tendency to block and remained free-flowing and storage-stable.

EXAMPLE 4

A 1,320 pound batch of powdered rubber-gilsonite was prepared as in Example 1 except that the rubber to gilsonite relationship was 25% by weight of rubber to 75% by weight of gilsonite. This product also remained storage-stable and free-flowing.

EXAMPLE 5

A 499 pound batch of powdered rubber-hard residual grade asphalt was prepared as in Example 1. The hard asphalt was a resinous material obtained from the still residue resulting from the distillation of Arkansas crude petroleum oil. The relationship between the rubber and hard asphalt was 20% by weight of rubber to 80% by weight of hard asphalt. The finished powder did not block and remained storage-stable and free-flowing.

EXAMPLE 6

A 446 pound patch of rubber-hard asphalt was prepared as in Example 5 except that the relationship between the rubber and hard asphalt was 25% by weight of rubber to 75% by weight of hard asphalt. This product also remained storage-stable and free-flowing.

EXAMPLE 7

A rubberized, powdered asphalt was prepared in the following manner. One hundred grams of a powdered hard residual grade asphalt capable of passing through a 60-mesh standard screen was slurried with 15% by weight of water. Ten percent by weight of rubber, based on the weight of hard asphalt, in the form of a 30% GR–S (butadiene-styrene) latex was blended with the asphalt slurry. The hard asphalt and unvulcanized rubber were co-precipitated by adjusting the pH of the mixture to 6.0 by means of alum. The finely divided particles of rubber and asphalt were filtered from the water and dried at a temperature of 150° F. to form a free-flowing powder which remained storage-stable.

EXAMPLE 8

A rubberized powder was prepared as in Example 7 from a pulverized microcrystalline hard asphalt resin and GR–S rubber. The resin was comminuted to pass through a 60-mesh standard screen, and was present in a ratio of 90 parts by weight of resin to 10 parts by weight of rubber. This product remained free-flowing and storage-stable for a period of many months.

EXAMPLE 9

A powdered, rubberized gilsonite was prepared in the following manner. The gilsonite was passed through a hammer mill in order to obtain a powder which would pass through a 200-mesh standard screen. One hundred grams of the powdered gilsonite were slurried with 4 litres of water. To this slurry 0.1 litre of GR–S latex was added, the latex containing 23% by weight of cold rubber solids. Co-precipitation was effected by adding 0.5 litre of a 25% by weight sodium chloride-water solution. The co-precipitated product was filtered, rolled to remove excess water and ground in a hammer mill to produce a free-flowing powder which remained storage-stable.

EXAMPLE 10

A product was prepared as in Example 9 except that the latex used was a 20% by weight hot rubber solids latex, and the coagulant was a 50% by weight calcium chloride-water solution. This powder also remained storage-stable and free-flowing.

EXAMPLE 11

Preparation by Endres et al. teachings

A water slurry of giltax (gilsonite having a softening point of 220–240° F.) was prepared first. The gilsonite was crushed, ground, and sized to pass a 35-mesh screen. Then 402 grams of water, 5 grams of a sodium salt of a condensed aryl sulfonic acid and 200 grams of this 35-mesh gilsonite, was placed in a ball mill. The ball mill was rotated overnight to prepare a slurry.

Rubber latex 1006 was prepared by a hot recipe co-polymerization using a sodium salt of a fatty acid type emulsifier and a peroxide initiator to give a 75% butadiene 25% styrene copolymer latex.

Three hundred and eighty-six grams of latex 1006 containing 3.6 grams of phenylbetanaphthylamine was agglomerated but not flocculated by the controlled addition with stirring of a first mixture consisting of 20 grams of sodium chloride, 80 grams water, and 0.7 gram of sodium hydroxide together with 5 cc. of a second mixture. About 30 minutes was required to make these additions. The temperature of the latex during this agglomeration treatment was maintained at 64° F. The second mixture consisted of 12 grams of sodium chloride and 200 grams water. After the addition of the last of the first mixture to latex 1006, 8 cc. of a 50% aqueous dispersion of sodium silicofluoride was added while still stirring the latex 1006 mixture. After several minutes, 455 grams of the above Gilsonite slurry was added and stirred into the agglomerated latex 1006 while the temperature was being increased. In one-half to three-quarters of an hour, the temperature of the latex mixture was 84° F. and flocculation had occurred to give a water suspension of the Gilsonite-rubber composition. The water suspension was cooled to 60–70° F. and filtered. The filter cake was resuspended in a liter of water and the resuspended solids were recovered by filtration. Then this filter cake was resuspended a second time in another liter of water, and filtered. This filter cake was pulped with a liter of acetone and filtered to obtain 252 grams of product. The washed filter cake was extremely fine, non-tacky, dry powder, and had the following screen analysis:

| Screen Size: | Grams | |
| --- | --- | --- |
| 20 mesh (20M) | 3 | (not passing). |
| 35 mesh (35M) | 8 | (not passing). |
| 35 mesh (35M) | 214.5 | (passing). |

This powdery, non-tacky rubber-in-Gilsonite composition was labeled "Gilsonite Rubarite 2/24" and was used in Experiment 12. Incidentally, it should be stated that the use of the acetone pulping treatment is not necessary to obtain a non-tacky dry product for similar products were obtained in pilot plant runs using air to remove the water. Acetone pulping is a convenient laboratory method for freeing the product of excess moisture.

EXPERIMENT 12

Dispersing test with Endres et al. composition

Three hundred and thirty-five grams of a 110 to 120 penetration grade was heated to 300° F. in a one-liter stainless steel beaker. To the hot asphalt in the beaker 19.35 grams of Gilsonite Rubarite 2/24 from Experiment 11 was added and stirred into the asphalt. Stirring of the asphalt was continued for one hour while maintaining the asphalt at 320–330° F. Microscopic examination of a sample taken from the beaker showed very good dispersion very shortly after the addition of the Gilsonite Rubarite 2/24 to the hot asphalt. Samples were taken at various times during the dispersion of Gilsonite Rubarite 2/24 into the asphalt and used to prepare microscopic slides. Photographs of these microscopic slides were taken at 130 magnification. The microscopic slides were examined under the microscope. The sample taken at 10 minutes mixing showed a good degree of dispersion and was relatively smooth. Examination of the slide prepared from the sample after 60 minutes mixing disclosed no substantial improvement in the dispersion as the dispersion was substantially complete in 10 minutes. Thus, it demonstrated that this method of preparation yields a powdery rubberized asphalt which is very readily dispersed in hot asphalt within a very short time. The free flowing, powdery rubber, hard bitumen composition of this invention is formed ab initio as fine particalized powder which exhibits no tendency to block or pelletize at 100° F. and at 100 pounds per square inch. This resistance to blocking is exhibited when the powder is maintained at this temperature and pressure for several hours.

Many of the products of the examples have been used as additives for liquid tars and asphalts which in turn have been used in the fabrication of paper products, roofing compositions and floor tiles.

While certain representative embodiments and details have been shown for the purpose of illustrating the invention, it will be apparent to those skilled in this art that various changes and modifications may be made therein without departing from the spirit or scope of the invention.

What is claimed is:

1. The process of preparing a powdery, free-flowing, rubber-hard bitumen composition comprising the steps of (1) adjusting the water content of a slurry of a powdered hard bitumen composition having a softening point above 200° F. but not over 400° F. until a slurry of about 25% by weight of hard bitumen and about 75% by weight of water is formed, said hard bitumen particles ranging in size from about 5 microns in diameter to about 50 microns in diameter, 90% of said particles being less than 10 microns in diameter, (2) maintaining the pH of said slurry above 7.0, (3) said hard bitumen slurry being mixed with a diene polymer rubber latex, said rubber being present in said mixture in the proportion of about 5 to 40% by weight of said rubber to about 95 to 60% by weight of said hard bitumen composition, (4) adding a coagulant to co-precipitate the rubber and hard bitumen to form a composition wherein the hard bitumen particles are coated with films of rubber, (5) drying and pulverizing the co-precipitated mixture in order to rupture said films of rubber to cause surface areas of said hard bitumen particles to protrude through the films and (6) recovering composite particles comprised of hard bitumen and associated discontinuous rubber particles to provide a powder wherein at least 95% will pass through a 60-mesh U.S. standard sieve.

2. The process according to claim 1 wherein the hard bitumen is hard asphalt.

3. The process according to claim 1 wherein the hard bitumen is gilsonite.

4. The process of claim 1 wherein step 4 occurs prior to step 3 but the co-precipitation occurs after step 3.

5. A free-flowing tack-free powdery rubber-hard bitumen composition capable of passing through a 60 mesh U.S. sieve which is composed of particles of hard bitumen of irregular surface area interlaced with adherent discontinuous films of unvulcanized rubber, said composition being
   (A) formed by co-precipitation of a mixture of
      (1) an aqueous suspension of a hard bitumen having a softening point above 200° F. but not over about 400° F. with the particles of said hard bitumen having a size range of from about 5 microns to about 50 microns in diameter with 90% by weight of said particles being less than 10 microns in diameter, and
      (2) a latex of an unvulcanized diene polymer rubber,
   (B) then drying said co-precipitate to obtain a composition consisting essentially of about 5 to 40 parts by weight of said rubber and 95 to 60 parts by weight of said hard bitumen and pulverizing the dry co-precipitated mixture in order to rupture said films of rubber to cause surface areas of said hard bitumen particles to protrude through the films.

6. A product according to claim 5 wherein the hard bitumen is a hard asphalt.

7. The product according to claim 5 wherein the hard bitumen is gilsonite.

References Cited by the Examiner

UNITED STATES PATENTS

| | | | |
|---|---|---|---|
| 2,688,009 | 8/54 | Crouch et al. | 260—28.5 |
| 2,700,655 | 1/55 | Endres et al. | 260—758 |
| 2,807,596 | 9/57 | Flickinger | 260—758 |

MORRIS LIEBMAN, *Primary Examiner.*

MILTON STERMAN, ALEXANDER H. BRODMERKEL, *Examiners.*

Dedication 3,202,623.—*Herbert A. Endres*, Cuyahoga Falls, Ohio, *Harold B. Pullar*, Hot Springs, Ark., and *Paul W. Gilkeson, Jr.*, Houston Tex. PROCESS OF PREPARING RUBBERIZED COMPOSITIONS. Patent dated Aug. 24, 1965. Dedication filed Jan. 17, 1969, by the assignee, *The Goodyear Tire & Rubber Company*.

Hereby dedicates to the people of the United States the entire term of said patent.

[*Official Gazette June 10, 1969.*]